(12) United States Patent
Suzuki

(10) Patent No.: US 9,027,833 B2
(45) Date of Patent: May 12, 2015

(54) COMMODITY INFORMATION DISPLAY APPARATUS AND METHOD FOR DISPLAYING COMMODITY INFORMATION IN DIFFERENT FORMS

(71) Applicant: Toshiba Tec Kabushiki Kaisha, Shinagawa-ku, Tokyo (JP)

(72) Inventor: Shigeaki Suzuki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/191,700

(22) Filed: Feb. 27, 2014

(65) Prior Publication Data

US 2014/0239070 A1 Aug. 28, 2014

(30) Foreign Application Priority Data

Feb. 28, 2013 (JP) .................................. 2013-039813

(51) Int. Cl.
*G06K 15/00* (2006.01)
*G06Q 30/06* (2012.01)

(52) U.S. Cl.
CPC ........ *G06Q 30/0623* (2013.01); *G06Q 30/0633* (2013.01); *G06Q 30/06* (2013.01)

(58) Field of Classification Search
USPC .......................................... 235/383, 385, 454
See application file for complete search history.

(56) References Cited

U.S. PATENT DOCUMENTS

| 6,260,023 | B1 | 7/2001 | Seevers et al. | |
| 2012/0265628 | A1* | 10/2012 | Jacobs | ............................ 705/23 |

* cited by examiner

*Primary Examiner* — Kristy A Haupt
(74) *Attorney, Agent, or Firm* — Amin, Turocy & Watson, LLP

(57) ABSTRACT

In accordance with one embodiment, a commodity information display apparatus comprises an acquisition module and a display control module. The acquisition module acquires a commodity information relating to a commodity recognized through a first method in which a code symbol attached to the commodity is read and commodity information relating to a commodity recognized through a second method in which the commodity is recognized based on an appearance feature of the commodity contained in an image data captured by a camera. The display control module displays the commodity information acquired by the acquisition module on a display in such a manner that a display form of the commodity information of the commodity recognized through the first method is made different from a display form of the commodity information of the commodity recognized through the second method.

6 Claims, 12 Drawing Sheets

FIG.2

| COMMODITY ID | COMMODITY NAME | REFERENCE IMAGE DATA 0 | FEATURE AMOUNT DATA 0 |
|---|---|---|---|
| | | REFERENCE IMAGE DATA 1 | FEATURE AMOUNT DATA 1 |
| | | REFERENCE IMAGE DATA 2 | FEATURE AMOUNT DATA 2 |
| | | REFERENCE IMAGE DATA 3 | FEATURE AMOUNT DATA 3 |
| | | REFERENCE IMAGE DATA 4 | FEATURE AMOUNT DATA 4 |
| | | ⋮ | ⋮ |
| | | REFERENCE IMAGE DATA N | FEATURE AMOUNT DATA N |

| ORDER | COMMODITY CODE | COMMODITY | REFERENCE IMAGE DATA | SIMILARITY DEGREE |
|---|---|---|---|---|
| 1 | | | | |
| 2 | | | | |
| 3 | | | | |
| 4 | | | | |
| 5 | | | | |

| No. | COMMODITY CODE | IDENTIFIER | COMMODITY NAME | UNIT PRICE | PURCHASE QUANTITY | • • • • • • • |
|---|---|---|---|---|---|---|
| 1 | CODE C1 | F0 | APPLE A | ¥300 | 5 | |
| 2 | CODE C1 | F2 | APPLE A | ¥300 | 1 | |
| 3 | CODE C2 | F1 | APPLE B | ¥400 | 4 | |
| 4 | CODE C3 | F1 | APPLE C | ¥400 | 4 | |
| 5 | CODE C3 | F2 | APPLE C | ¥400 | 1 | |
| 6 | CODE C4 | F0 | GROCERIES D | ¥100 | 1 | |
| 7 | CODE C5 | F0 | GROCERIES E | ¥100 | 1 | |
| ⋮ | | | | | | |

| COMMODITY NAME | UNIT PRICE | BARCODE | OBJECT RECOGNITION | | PRICE |
| --- | --- | --- | --- | --- | --- |
| | | | AUTOMATIC DETERMINATION | CASHIER SELECTION | |
| | | PURCHASE QUANTITY X | PURCHASE QUANTITY Y | PURCHASE QUANTITY Z | |
| APPLE A | ¥300 | 5 | 0 | 1 | ¥1,800 |
| APPLE B | ¥400 | 0 | 4 | 0 | ¥1,600 |
| APPLE C | ¥400 | 0 | 4 | 1 | ¥2,000 |
| GROCERIES D | ¥100 | 1 | 0 | 0 | ¥100 |
| GROCERIES E | ¥100 | 1 | 0 | 0 | ¥100 |
| TOTAL | | 7 | 8 | 2 | ¥5,600 |

| COMMODITY NAME | UNIT PRICE | PURCHASE QUANTITY P | PRICE |
| --- | --- | --- | --- |
| APPLE A | ¥300 | 6 | ¥1,800 |
| APPLE B | ¥400 | 4 | ¥1,600 |
| APPLE C | ¥400 | 5 | ¥2,000 |
| GROCERIES D | ¥100 | 1 | ¥100 |
| GROCERIES E | ¥100 | 1 | ¥100 |
| TOTAL | | 17 | ¥5,600 |

| COMMODITY NAME | UNIT PRICE | RECOGNITION METHOD | PURCHASE QUANTITY | PRICE |
|---|---|---|---|---|
| APPLE A | ¥300 | BARCODE | 5 | ¥1,500 |
| APPLE A | ¥300 | CASHIER SELECTION | 1 | ¥ 300 |
| APPLE B | ¥400 | AUTOMATIC DETERMINATION | 4 | ¥1,600 |
| APPLE C | ¥400 | AUTOMATIC DETERMINATION | 4 | ¥1,600 |
| APPLE C | ¥400 | CASHIER SELECTION | 1 | ¥ 400 |
| GROCERIES D | ¥100 | BARCODE | 1 | ¥100 |
| GROCERIES E | ¥100 | BARCODE | 1 | ¥100 |
| TOTAL | | | 17 | ¥5,600 |

COMMODITY INFORMATION DISPLAY APPARATUS AND METHOD FOR DISPLAYING COMMODITY INFORMATION IN DIFFERENT FORMS

CROSS-REFERENCE TO RELATED APPLICATION

This application is based upon and claims the benefit of priority from Japanese Patent Application No. 2013-039813, filed Feb. 28, 2013, the entire contents of which are incorporated herein by reference.

FIELD

Embodiments described herein relate to a commodity information display apparatus and a method for displaying commodity information in different forms.

BACKGROUND

Conventionally, a settlement apparatus such as a POS (Point Of Sales) terminal registers a commodity corresponding to an identifier input by reading a barcode with a scanner apparatus as a commodity purchased by a customer. The settlement apparatus and the scanner apparatus display the commodity information such as a name and a price of the registered commodity on a display as a list.

In recent years, there exists a settlement apparatus and a scanner apparatus both of which are provided with an object recognition function for recognizing a commodity based on the appearance feature of the commodity contained in an image data obtained by photographing the commodity with a camera as well as the function for reading a barcode.

BRIEF DESCRIPTION OF THE DRAWINGS

FIG. 2 is a schematic view illustrating one example of the data structure of a dictionary file;

FIG. 3 is a schematic view illustrating one example of the data structure of a candidate buffer;

FIG. 4 is a schematic view illustrating one example of the data structure of a registration buffer;

FIG. 9 is a schematic view illustrating one example of a first registration screen;

FIG. 10 is a schematic view illustrating one example of a second registration screen;

FIG. 14 is a schematic view illustrating a modification of the first registration screen.

DETAILED DESCRIPTION

In accordance with one embodiment, a commodity information display apparatus comprises an acquisition module and a display control module. The acquisition module acquires a commodity information relating to a commodity recognized through a first method in which a code symbol attached to the commodity is read and commodity information relating to a commodity recognized through a second method in which the commodity is recognized based on an appearance feature of the commodity contained in an image data captured by a camera. The display control module displays the commodity information acquired by the acquisition unit on a display in such a manner that a display form of the commodity information of the commodity recognized through the first method is made different from a display form of the commodity information of the commodity recognized through the second method.

One embodiment is described with reference to the accompanying drawings. In the present embodiment, a POS system used in a retail store is disclosed.

(System Constitution)

Figure 1:
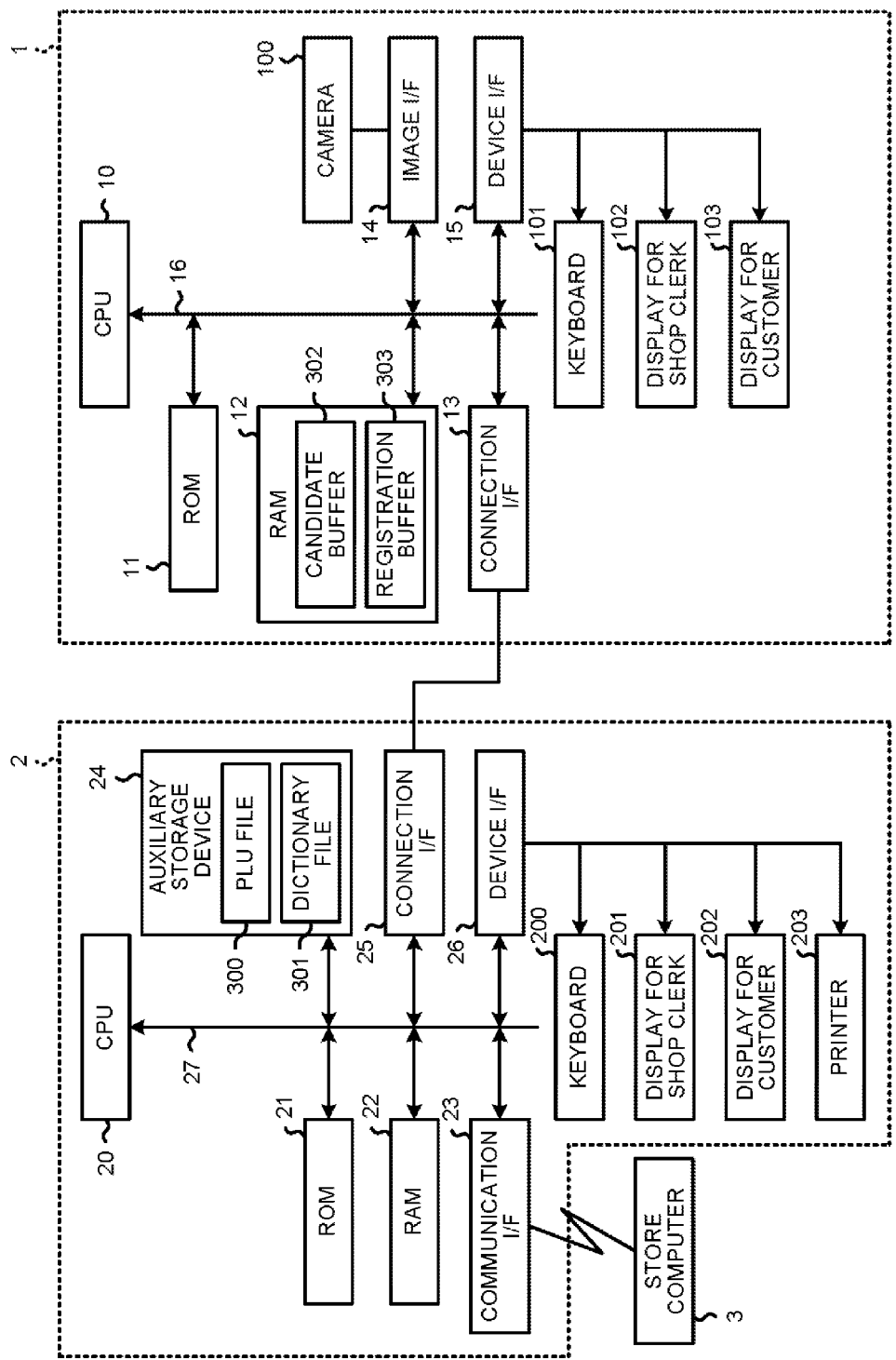
FIG. 1 is a block diagram illustrating a constitution of a POS system according to an embodiment.

FIG. 1 is a block diagram illustrating the constitution of the POS system according to the present embodiment.

The POS system includes a scanner apparatus 1 and a POS terminal 2. Both the scanner apparatus 1 and the POS terminal 2 are one form of the commodity information display apparatus.

The scanner apparatus 1, which is a so-called stand type scanner, is arranged on a checkout counter. The scanner apparatus 1 is used to input a commodity code such as a JAN code of a commodity purchased by a customer. The POS terminal 2 is arranged nearby the checkout counter. The POS terminal 2 is used to settle the payment of the commodity purchased by the customer based on the commodity code input through the scanner apparatus 1.

The scanner apparatus 1 comprises a CPU (Central Processing Unit) 10, a ROM (Read Only Memory) 11, a RAM (Random Access Memory) 12, a connection I/F (Interface) 13, an image I/F 14, a device I/F 15, a bus line 16, a camera 100, a keyboard 101, a display for shop clerk 102 and a display for customer 103.

The bus line 16 connects the CPU 10, the ROM 11, the RAM 12, the connection I/F 13, the image I/F 14, and the device I/F 15. The image I/F 14 is connected with the camera 100. The device I/F 15 is connected with the keyboard 101, the display for shop clerk 102 and the display for customer 103.

The CPU 10 is a main control module of the scanner apparatus 1. The ROM 11 stores computer programs and the like for realizing operations shown in the flowcharts in FIG. 6, FIG. 7, FIG. 8 and FIG. 11. The RAM 12 forms various work memory areas. The connection I/F 13 connects, in a wired or wireless manner, the scanner apparatus 1 with the POS terminal 2 to make a communication therebetween.

The camera 100 comprises a CCD (Charge Coupled Device) image capturing element serving as an area image sensor and a drive circuit thereof, and a lens for focusing an image of an image capturing area on the CCD image capturing element. The image capturing area refers to a peripheral area focused on the area of the CCD image capturing element through the lens from a reading window arranged in a housing of the scanner apparatus 1. The camera 100 outputs the image data of the image capturing area focused on the CCD image capturing element through the lens. The image I/F 14 acquires the image data output from the camera 100.

The keyboard 101 includes various operation keys such as a numeric key (ten keys) and a subtotal key. The display for shop clerk 102 comprises a display panel, for example, an LCD (Liquid Crystal Display) panel and a touch panel for detecting an operation on a display screen of the display panel. The display for shop clerk 102 is arranged on the housing of the scanner apparatus 1 in such a manner that the display screen thereof is directed to a shop clerk who operates the scanner apparatus 1. The display for customer 103 comprises a display panel, for example, an LCD panel. The display for customer 103 is arranged on the housing of the scanner apparatus 1 in such a manner that the display screen thereof is directed to a customer who receives the checkout service.

The POS terminal 2 comprises a CPU 20, a ROM 21, a RAM 22, a communication I/F 23, an auxiliary storage device 24, a connection I/F 25, a device I/F 26, a bus line 27, a keyboard 200, a display for shop clerk 201, a display for customer 202 and a printer 203.

The bus line 27 connects the CPU 20, the ROM 21, the RAM 22, the communication I/F 23, the auxiliary storage device 24, the connection I/F 25 and the device I/F 26. The device I/F 26 is connected with the keyboard 200, the display for shop clerk 201, the display for customer 202 and the printer 203.

The CPU 20 is a main control module of the POS terminal 2. The ROM 21 stores computer programs and the like for realizing operations shown in the flowchart in FIG. 12 described later. The RAM 22 forms various work memory areas. The communication I/F 23 connects, in a wired or wireless manner, the POS terminal 2 with a store computer 3 to make a communication. The store computer 3 manages data relating to sales, stock, order and the like of a store. The auxiliary storage device 24 is a high-capacity storage device such as an HDD (Hard Disk Drive) or an SSD (Solid State Device) and the like. The connection I/F 25 connects, in a wired or wireless manner, the POS terminal 2 with the scanner apparatus 1 to make a communication therebetween.

The keyboard 200 includes various operation keys such as a numeric key (ten keys), a deposit/cash total key, a credit total key and the like. The display for shop clerk 201 comprises a display panel, for example, an LCD panel and a touch panel for detecting an operation on a display screen of the display panel. The display for shop clerk 201 is arranged on the housing of the POS terminal 2 in such a manner that the display screen thereof is directed to a shop clerk who operates the POS terminal 2. The display for customer 202 comprises a display panel, for example, an LCD panel. The display for customer 202 is arranged on the housing of the POS terminal 2 in such a manner that the display screen thereof is directed to a customer who receives the checkout service. The printer 203 is, for example, a thermal printer for printing a receipt and a journal on a thermal paper.

The auxiliary storage device 24 stores a PLU (Price Look Up) file 300 and a dictionary file 301 (refer to FIG. 2) and the like. The PLU file 300 stores a commodity information containing the name, price and the like of a commodity in association with each commodity code of a commodity sold in the store. The POS terminal 2 downloads the PLU file 300 and the dictionary file 301 from the store computer 3 at timing when, for example, these files are updated, and writes them in the auxiliary storage device 24.

The scanner apparatus 1 according to the present embodiment has an object recognition function in which the category of a commodity is recognized from the appearance feature of the commodity contained in the image data generated by the camera 100 by using a general object recognition technology. Specifically, the scanner apparatus 1 calculates the appearance feature amount of a commodity contained in the image data, compares the calculated feature amount with the feature amount data of a reference image registered in the dictionary file 301 to calculate a similarity degree, and then recognizes the category of the commodity based on the similarity degree.

The object recognition function of the scanner apparatus 1 includes an automatic determination function and a selection determination function. The automatic determination function is a function for automatically determining (without any human operation) the category of the commodity from the appearance feature of the commodity contained in the image data. The selection determination function is a function for selecting candidates of the category of the commodity from the appearance feature of the commodity contained in the image data, and then determining the commodity designated through a human operation from the candidates as the category of the commodity contained in the image data.

In addition, the scanner apparatus 1 further comprise a symbol code reading function for decoding a symbol code, for example, a barcode, contained in the image data generated by the camera 100 to recognize the category of the commodity.

FIG. 2 is a schematic view illustrating data structure of the dictionary file 301. The dictionary file 301 includes a record provided for each commodity code of a commodity serving as a recognition target of the object recognition function. One record includes a commodity code, a commodity name of the commodity specified with the commodity code, a plurality of reference image data 0~N and a plurality of feature amount data 0~N. The reference image data 0~N is an image data obtained by photographing a commodity identified with the corresponding commodity code in different directions. The feature amount data 0~N is a data obtained by extracting a feature amount relating to the appearance (contour, hue, pattern, concave-convex state and the like) of the commodity from the reference image data 0~N of the corresponding commodity, and then parameterizing the feature amount. The commodity to be subjected to the recognition with the object recognition function is, for example, a commodity to which no barcode is attached. However, a commodity to which a barcode is attached may also be included in the recognition target.

The scanner apparatus 1 can access the PLU file 300 and the dictionary file 301 through the communication with the POS terminal 2 via the connection I/Fs 13 and 25.

In a case in which the POS system executes a checkout processing of a commodity, the CPU 10 of the scanner apparatus 1 forms a candidate buffer 302 with the data structure shown in FIG. 3 and a registration buffer 303 with the data structure shown in FIG. 4 in the RAM 12.

The candidate buffer 302 is a memory area in which the candidate of the commodity recognized through the object recognition function is registered. The candidate buffer 302 includes records assigned with ranking (the first to the fifth in FIG. 3). Each record includes areas for writing ranking, a commodity code, a commodity name, a reference image data, and a similarity degree of the corresponding candidate.

The registration buffer 303 is a memory area in which information relating to each commodity recognized through the code symbol reading function or the object recognition function is registered. The registration buffer 303 includes a record corresponding to each commodity recognized through the code symbol reading function or the object recognition function. Each record includes areas in which a commodity code, an identifier, a commodity name, a unit price, a purchase quantity and the like of the corresponding commodity are written. The identifier indicates that the corresponding commodity is recognized with a specified one of the code symbol reading function, the automatic determination function, and the selection determination function. In the present embodiment, the identifier for specifying the code symbol reading function is set to 'F0', the identifier for specifying the automatic determination function is set to 'F1', the identifier for specifying the selection determination function is set to 'F2'. In FIG. 4, the registration buffer 303 is shown in a state in which the commodity is registered and the data thereof is already written, however, the data is not written in the registration buffer 303 at the beginning of the checkout processing for one customer.

Figure 5:
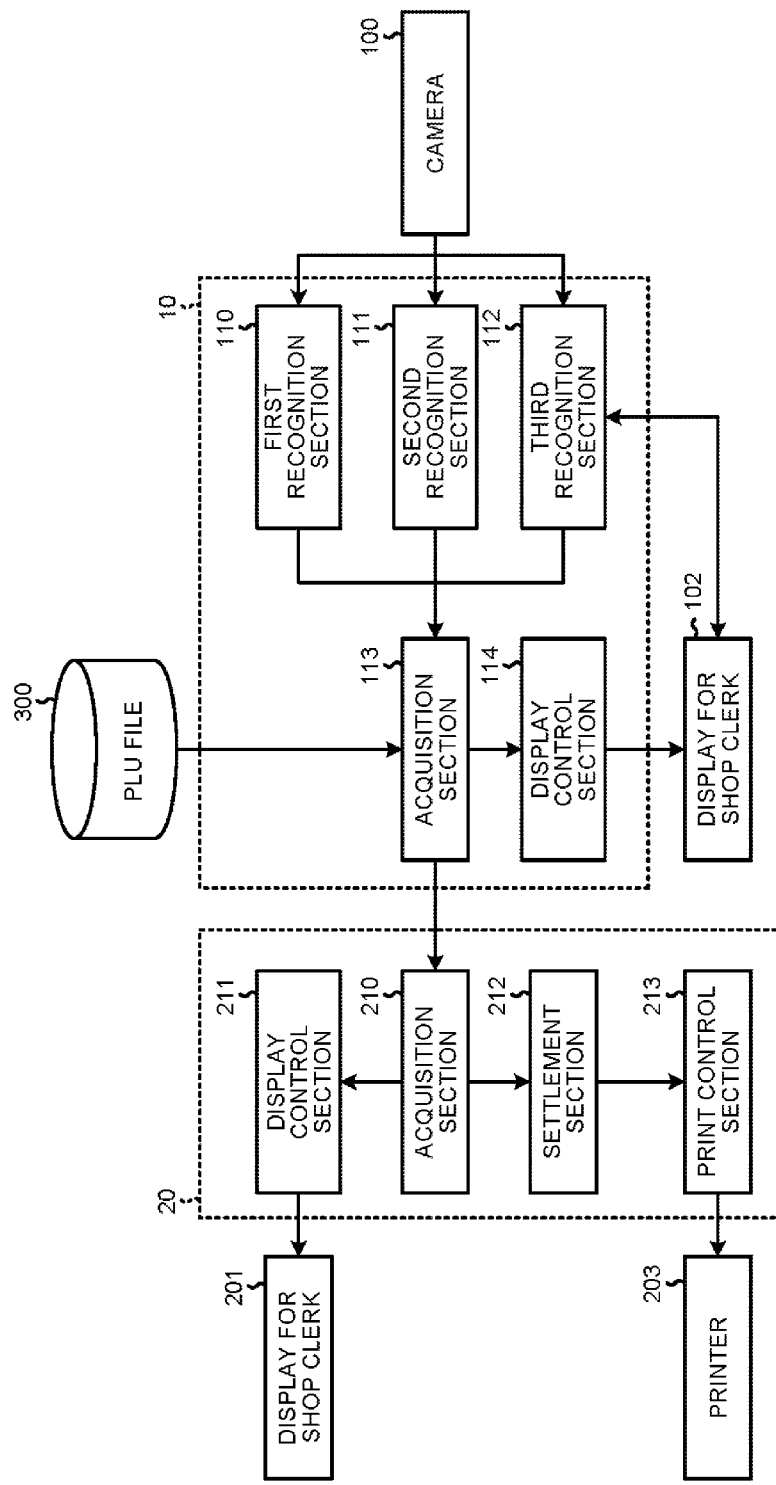
FIG. 5 is a block diagram illustrating functions realized by the CPU of a scanner apparatus and a POS terminal.

The functions realized by the CPU 10 of the scanner apparatus 1 and the CPU 20 of the POS terminal 2 are described with reference to the block diagram shown in FIG. 5.

The CPU 10 functions as a first recognition section 110, a second recognition section 111, a third recognition section 112, an acquisition section 113, and a display control section 114 by executing the computer programs stored in the ROM 11.

The first recognition section 110 executes a processing relating to the code symbol reading function. The first recognition section 110 decodes the barcode attached to a commodity contained in the image data generated by the camera 100 and acquires the commodity code represented by the barcode to recognize the category of the commodity.

The second recognition section 111 and the third recognition section 112 execute a processing relating to the object recognition function. The second recognition section 111 and the third recognition section 112 recognize the category of the commodity based on the appearance feature of the commodity contained in the image data generated by the camera 100. Specifically, the second recognition section 111 executes a processing relating to the automatic determination function. Further, the third recognition section 112 executes a processing relating to the selection determination function.

The acquisition section 113 acquires a commodity information relating to the commodity recognized by the first to the third recognition sections 110~112. Specifically, in the present embodiment, the acquisition section 113 sends the commodity code of the commodity recognized by the first to the third recognition sections 110~112 to the POS terminal 2, and then receives the commodity information corresponding to the commodity code from the POS terminal 2 to acquire the commodity information.

The display control section 114 displays the commodity information acquired by the acquisition section 113 on the display for shop clerk 102 in such a manner that a display form of the commodity information of a commodity recognized through the first method is made different from a display form of the commodity information of a commodity recognized through the second method. The first method refers to, for example, a commodity recognition based on the code symbol reading function, and the second method refers to, for example, a commodity recognition based on the object recognition function. Further, the first method may also be, for example, a commodity recognition based on the automatic determination function, and the second method may also be, for example, a commodity recognition based on the selection determination function.

The CPU 20 executes the computer programs stored in the ROM 21 to function as an acquisition section 210, a display control section 211, a settlement section 212, and a print control section 213.

The acquisition section 210 acquires a commodity information relating to the commodity recognized by one of the first to the third recognition sections 110~112. Specifically, in the present embodiment, the acquisition section 210 receives the registration buffer 303 in which the commodity information of the commodity recognized by one of the first to the third recognition sections 110~112 is written from the scanner apparatus 1 to acquire the commodity information.

The display control section 211 displays the commodity information acquired by the acquisition section 210 on the display for shop clerk 201 in such a manner that a display form of the commodity information of a commodity recognized through the first method is made different from a display form of the commodity information of a commodity recognized through the second method.

The settlement section 212 settles the payment of the commodity relating to the commodity information acquired by the acquisition section 210 in one commodity transaction. The settlement may be carried out through any media such as cash, credit card, or electronic money and the like.

The print control section 213 enables the printer 203 to print the receipt and the journal on which the commodity information of the commodities in the commodity transaction the payment of which is settled by the settlement section 212 is arranged. Specifically, in the present embodiment, the print control section 213 makes the printer 203 print the receipt and the journal on which the commodity information is arranged in such a manner that a printing form of the commodity information of a commodity recognized through the first method is different from a printing form of the commodity information of a commodity recognized through the second method.

The operations of the CPU 10 acting as each section 110~114, and the operations of the CPU 20 acting as each section 210~213 are disclosed below in detail.

(Operations of the Scanner Apparatus)

Figure 6:
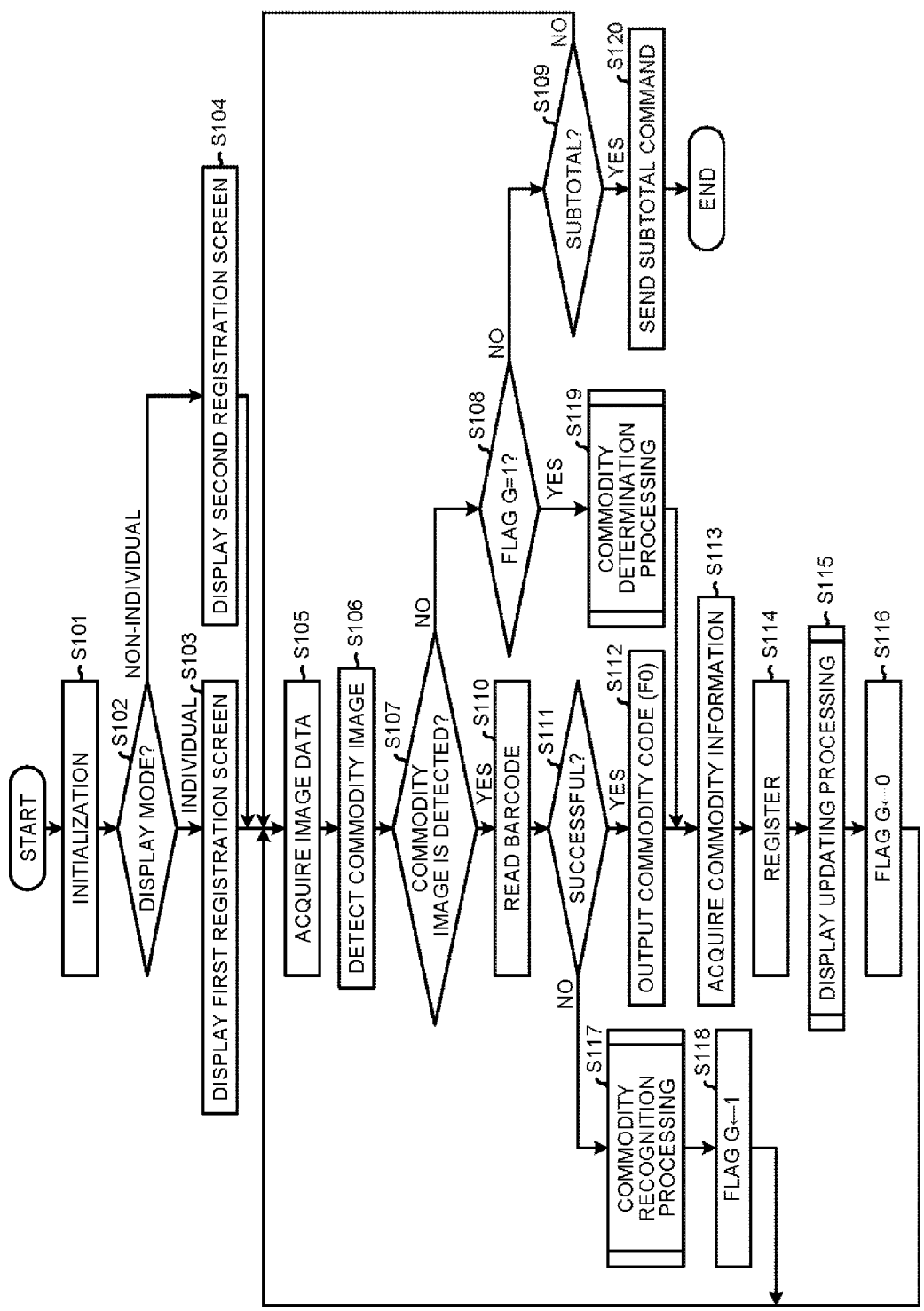
FIG. 6 is a flowchart illustrating main operations of the scanner apparatus.
Figure 7:
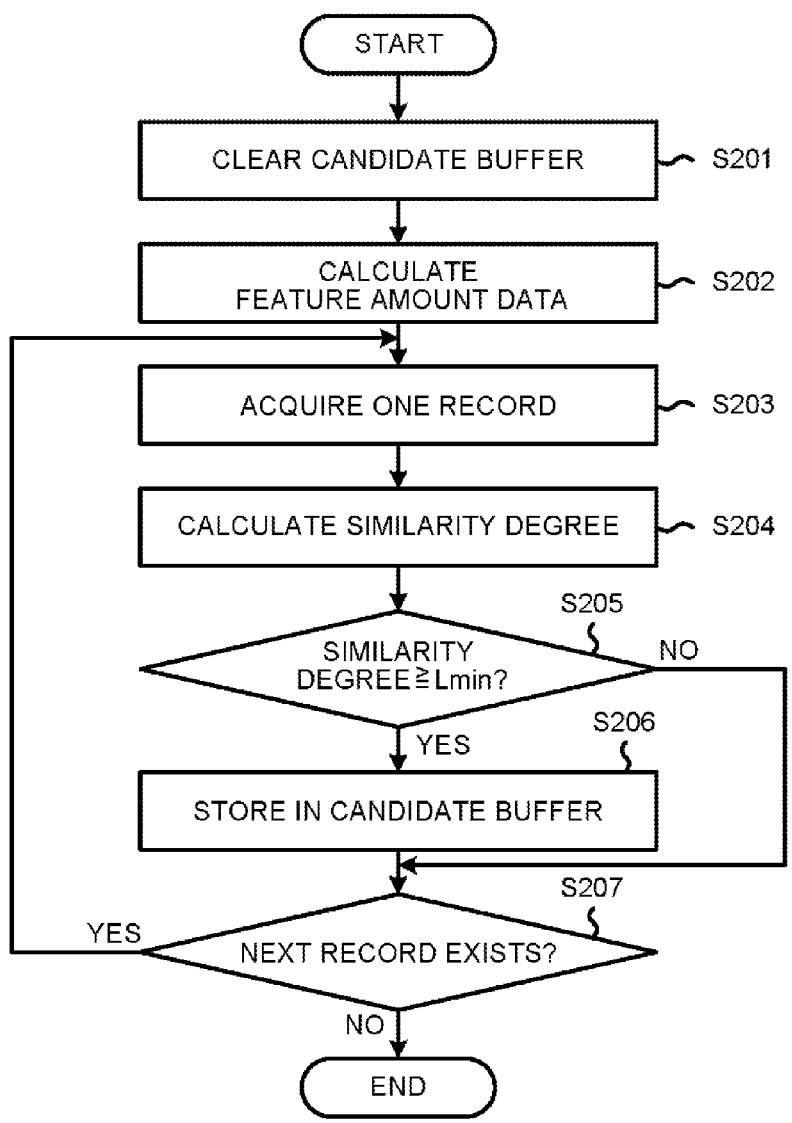
FIG. 7 is a flowchart illustrating operations of the scanner apparatus in a commodity recognition processing.

In an operating state of the POS system, the CPU 10 of the scanner apparatus 1 operates according to the flowchart shown in FIG. 6.

In the flowchart, first, the CPU 10 executes an initializing processing (ACT S101). In the processing, the CPU 10 forms the candidate buffer 302, the registration buffer 303, and a flag G in the RAM 12. No data is written in the candidate buffer 302 and the registration buffer 303 generated herein. The content of the flag G is '0'.

After the processing in ACT S101 is executed, the CPU 10 determines, with reference to a mode information stored in the ROM 11, either one of an individual mode or a non-individual mode that is set to the display for shop clerk 102 (ACT S102). The individual mode is a mode for displaying the information corresponding to each record in the registration buffer 303 in such a manner that one of the symbol code reading function, the automatic determination function, and the selection determination function with which the commodity is registered can be distinguished. The non-individual mode is a mode for displaying the information corresponding to each record in the registration buffer 303 without distinguishing one of the symbol code reading function, the automatic determination function, and the selection determination function with which the commodity is registered. The mode information stored in the ROM 11 represents one of the individual mode and the non-individual mode. The mode information can be rewritten from the individual mode to the non-individual mode or vise versa by a user through, for example, an operation on the keyboard 101 of the scanner apparatus 1.

If the display mode is set to the individual mode ('individual' in ACT S102), the CPU 10 displays a first registration screen (refer to FIG. 9) on the display for shop clerk 102 (ACT S103). On the other hand, if the display mode is set to the non-individual mode ('non-individual' in ACT S102), the CPU 10 displays a second registration screen (refer to FIG. 10) on the display for shop clerk 102 (ACT S104).

After the processing in ACT S103 or ACT S104 is executed, the CPU 10 acquires the image data generated by the camera 100 through the image I/F 14, and writes the image data in the RAM (ACT S105).

After the processing in ACT S105 is executed, the CPU 10 analyzes the image data written in the RAM 12 to detect a commodity image from the image data (ACT S106). Specifically, the CPU 10 detects a contour line from the binary image of the image data. Then the CPU 10 tries to extract the contour of an object reflected in the image data. If the contour of the object is extracted, the CPU 10 regards the image in the contour as the commodity image.

The CPU 10 determines whether or not the commodity image is detected from the image data (ACT S107). If it is determined that the commodity image is not detected (NO in ACT S107), the CPU 10 determines whether or not the content of the flag G is '1' (ACT S108). The content of the flag G is set to '0' at the beginning of the operations shown in the flowchart. In this case, the CPU 10 determines that the flag G is not '1' (NO in ACT S108), then the CPU 10 determines whether or not a subtotal instruction is input (ACT S109). The subtotal instruction is input through, for example, an operation by a user on the subtotal key arranged on the keyboard 101. If it is determined that the subtotal instruction is not input (NO in ACT S109), ACT S105 is taken. If the subtotal instruction is input in a state that no data is written in the registration buffer 303, the CPU 10 deals the instruction as an error although it is not shown in the flowchart. In this case, ACT S105 is taken.

In this way, the CPU 10 repeats the processing from ACT S105 to ACT S109 until the commodity image is detected from the image data generated by the camera 100. If a shop clerk holds a commodity carried to the register by a customer over the image capturing area of the camera 100, the commodity is reflected in the image data. In this case, the CPU 10 detects the commodity image in ACT S106.

If the commodity image is detected (YES in ACT S107), the CPU 10 analyzes the commodity image to try to read the barcode attached to the commodity (ACT S110). Specifically, the CPU 10 tries to detect the bar pattern of the barcode from the commodity image. If the bar pattern is detected, the CPU 10 tries to decode the bar pattern. The reading of the barcode is determined to be successful if the commodity code is obtained through the decoding. On the other hand, the reading of the barcode is determined to be unsuccessful if the bar pattern is not included in the image data, or if the bar pattern cannot be decoded although it is included in the image data. As described above, the processing of recognizing the category of the commodity from the commodity code acquired by reading the barcode is equivalent to the function of the first recognition section 110.

After the processing in ACT S110 is executed, the CPU 10 determines whether or not the barcode reading is successful (ACT S111). If it is determined that the barcode reading is successful (YES in ACT S111), the CPU 10 sends (outputs) the commodity code obtained through the barcode reading and the identifier 'F0' to the POS terminal 2 (ACT S112). Then, the CPU 10 takes ACT S105 through the processing from ACT S113 to ACT S116 described later.

On the other hand, if it is determined that the barcode reading is unsuccessful (NO in ACT S111), the CPU 10 executes a commodity recognition processing (ACT S117). In the commodity recognition processing, the CPU 10 operates according to the flowchart shown in FIG. 7.

In the flowchart, first, the CPU 10 clears the candidate buffer 302 (ACT S201). Next, the CPU 10 calculates the appearance feature amount data of a commodity from the commodity image detected in ACT S106 (ACT S202). The appearance feature amount data is obtained by extracting the feature amount relating to the appearance (contour, hue, pattern, concave-convex state and the like) of the commodity from the commodity image, and then parameterizing the feature amount.

After the appearance feature amount data is calculated, the CPU 10 acquires the record of one commodity from the dictionary file 301 (ACT S203). Specifically, the CPU 10 reads the record (the commodity code, the commodity name, the reference image data 0~N and the feature amount data 0~N) of one commodity from the dictionary file 301 stored in the auxiliary storage device 24 through the communication with the POS terminal 2. However, the method of acquiring the record of one commodity is not limited to this. For example, the dictionary file 301 is stored in a memory such as the ROM 11 of the scanner apparatus 1, and the CPU 10 may read the record of one commodity from the dictionary file 301.

After the record of one commodity is acquired, the CPU 10 calculates the similarity degree for each feature amount data 0~N of the record (ACT S204). The similarity degree is a value representing how much similar the feature amount data 0~N is to the appearance feature amount data calculated in ACT S202. Further, in ACT S204, the CPU 10 determines the highest value of the similarity degree calculated for each feature amount data 0~N as the similarity degree between the commodity indicated by the commodity code in the record and the commodity photographed by the camera 100.

After the similarity degree is determined, the CPU 10 determines whether or not the determined similarity degree is greater than a predetermined threshold value Lmin (ACT S205). The threshold value Lmin is a lower limit value of the similarity degree according to which the commodity specified with the commodity code in the record acquired in ACT S203 can be retained as a candidate of the commodity photographed by the camera 100. If the determined similarity degree is greater than the threshold value Lmin (YES in ACT S205), the CPU 10 writes the commodity code, the commodity name, the reference image data, and the determined similarity degree in the record acquired in ACT S203 in the candidate buffer 302. The reference image data written in the candidate buffer 302 is, for example, the reference image data corresponding to the feature amount data relating to the highest similarity degree in the similarity degrees calculated in ACT S204.

After the processing in ACT S206 is executed, the CPU 10 determines whether or not there is a record which is not being acquired in the dictionary file 301 (ACT S207). If it is determined that there is a record which is not being acquired (YES in ACT S207), the CPU 10 takes ACT S203. The CPU 10 acquires one record which is not being acquired from the dictionary file 301, and repeats the operations from ACT S204 to ACT S206 by taking the acquired record as a target. If it is determined that the similarity degree calculated in ACT S204 is smaller than the threshold value Lmin (NO in ACT S205), ACT S207 is taken without carrying out the processing in ACT S206.

In this way, in the process of repeating the processing from ACT S203 to ACT S207, the data relating to the candidate of the commodity photographed by the camera 100 is written in the candidate buffer 302. When the data is written in the candidate buffer 302, the CPU 10 sorts the candidate buffer 302 in such a manner that the data with higher similarity degree is arranged to a record of higher number in ranking in the candidate buffer 302. If the similarity degrees sequentially calculated in ACT S204 are all low, there may be a case in which no data is written in the candidate buffer 302. If there is no record which is not being acquired in the dictionary file 301 (NO in ACT S207), the CPU 10 ends the operations shown in the flowchart in FIG. 7.

Now description is returned to the flowchart in FIG. 6. After the commodity recognition processing is executed, the CPU 10 sets the flag G to '1' (ACT S118). Then the CPU 10 takes the processing in ACT S105.

If the commodity is reflected in the image data generated by the camera 100, and the barcode reading is unsuccessful, the CPU 10 repeats the processing in ACT S105~ACT S107, S110, S111, S117, S118. When the shop clerk moves the commodity out of the image capturing area of the camera 100, the CPU 10 cannot detect the commodity image (NO in ACT S107). In this case, the CPU 10 determines that the content of the flag G is '1' (YES in ACT S108), and executes the commodity determination processing (ACT S119). In the commodity determination processing, the CPU 10 operates according to the flowchart in FIG. 8.

In the flowchart, first, the CPU 10 determines whether or not there is a record in which data relating to the commodity candidate is written in the candidate buffer 302 (ACT S301). If there is, even one, record in which data is written (YES in ACT S301), the CPU 10 determines whether or not the highest similarity degree in the similarity degrees written in these records, that is, the similarity degree written in the record (record in highest number) which is ranked at the first place is greater than a preset threshold value Lmax (Lmax>Lmin) (ACT S302). The threshold value Lmax is a lower limit value of similarity degree according to which the commodity photographed by the camera 100 can be determined as the commodity specified by the commodity code written in the record.

If it is determined that the similarity degree written in the first record in ranking is greater than the threshold value Lmax (YES in ACT S302), the CPU 10 recognizes the commodity specified by the commodity code written in the record as the commodity photographed by the camera 100. In this case, the CPU 10 sends (outputs) the commodity code written in the record and the identifier 'F1' to the POS terminal 2 (ACT S303). In this way, the processing in which the category of the commodity photographed by the camera 100 is recognized by determining the category of the commodity from the commodities respectively specified by the commodity codes written in the candidate buffer 302 without any operation of the shop clerk is equivalent to the function (automatic determination function) of the second recognition section 111.

On the other hand, if it is determined that the similarity degree written in the first record in ranking is not greater than the threshold value Lmax (NO in ACT S302), the CPU 10 displays a commodity selection screen on the display for shop clerk 102 (ACT S304). The commodity selection screen includes a GUI (Graphical User Interface) for a shop clerk to select a commodity. The GUI may be, for example, an image respectively corresponding to each reference image data written in each record in the candidate buffer 302. In a state that display of the commodity selection screen is kept, the CPU 10 waits for the selection of the commodity (NO in ACT S305).

If the shop clerk operates one of the GUI arranged on the commodity selection screen through the touch panel (YES in ACT S305), the CPU 10 recognizes the commodity specified with the commodity code corresponding to the operated GUI as the commodity photographed by the camera 100. In this case, the CPU 10 sends (outputs) the commodity code and the identifier 'F2' to the POS terminal 2 (ACT S306). In this way, the processing of recognizing the category of the commodity photographed by the camera 100 by determining the commodity from the commodities respectively specified with the commodity codes written in the candidate buffer 302 through the operation of the shop clerk is equivalent to the function (selection determination function) of the third recognition section 112.

Figure 8:
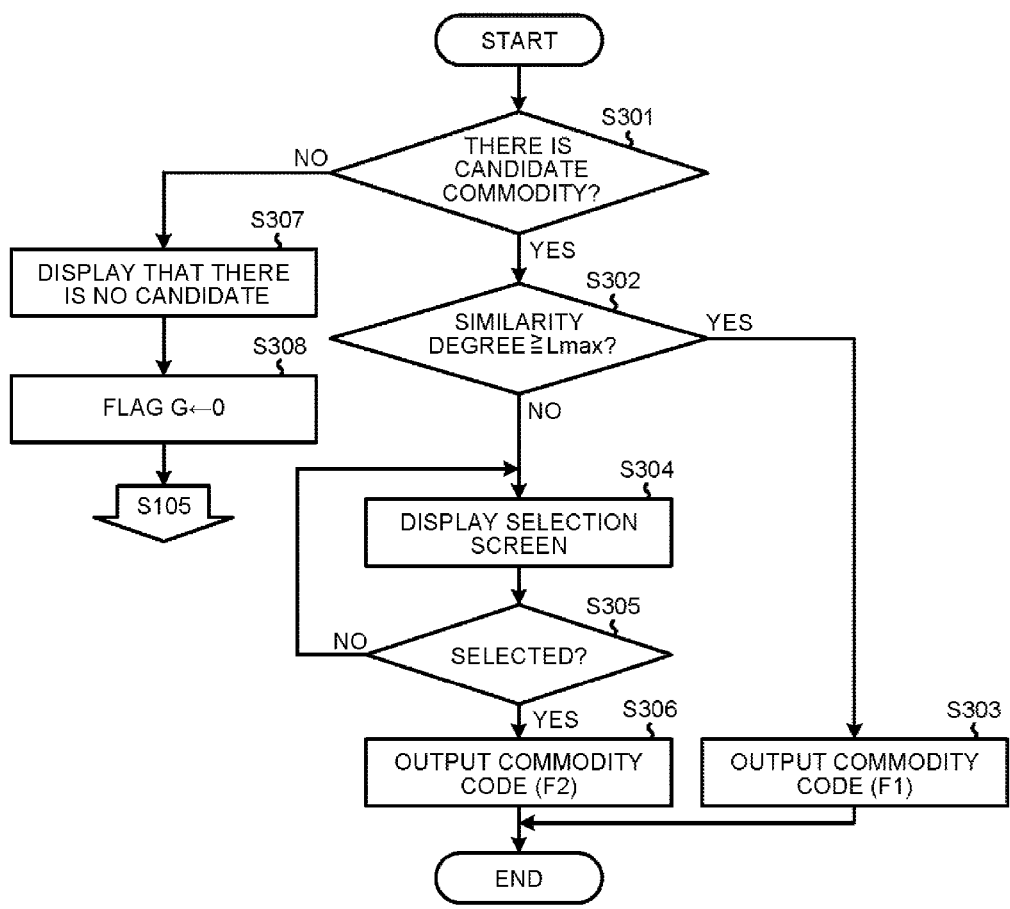
FIG. 8 is a flowchart illustrating operations of the scanner apparatus in a commodity determination processing.

After the processing in ACT S303 or ACT S306 is executed, the CPU 10 ends the operations shown in the flowchart in FIG. 8. If the candidate buffer 302 has no record in which data is written (NO in ACT S301), the CPU 10 displays a message indicating that there is no candidate commodity on the display for shop clerk 102 (ACT S307). Further, the CPU 10 sets the content of the flag G to '0' (ACT S308). Then, the processing in ACT S105 is carried out.

In this way, the processing in ACT S112, ACT S303, or ACT S306 is executed by the CPU 10, and the commodity code is sent to the POS terminal 2 from the scanner apparatus 1. After receiving the commodity code, the CPU 20 of the POS terminal 2 sends the commodity information associated with the commodity code from the PLU file 300 stored in the auxiliary storage device 24 to the scanner apparatus 1 as a reply. The CPU 10 of the scanner apparatus 1 receives the commodity information sent from the POS terminal to acquire the commodity information relating to the commodity recognized from the image data (ACT S113). The method of acquiring the commodity information is not limited to this. For example, the PLU file 300 is stored in the ROM 11 of the scanner apparatus 1, and the CPU 10 may also acquire the commodity information from the PLU file 300. In this way, the processing of acquiring the commodity information of the commodity recognized from the image data is equivalent to the function of the acquisition section 113.

After the processing in ACT S113 is executed, the CPU 10 registers the acquired commodity information in the registration buffer 303 (ACT S114). In this processing, the CPU 10 generates a record in which the commodity information is written in the registration buffer 303. The CPU 10 writes the commodity code and the identifier sent to the POS terminal 2 in ACT S112, ACT S303, or ACT S306, the commodity information acquired in ACT S113, the purchase quantity of the commodity and the like in the generated record. The default value of the purchase quantity is '1', and in a case that the shop clerk inputs a value larger than 1 through an operation on the keyboard 101, the purchase quantity is the input value. Further, the CPU 10 writes a value obtained by multiplying the unit price by the purchase quantity in the record as a 'total price'.

After the processing in ACT S114 is executed, the CPU 10 executes a display updating processing (ACT S115). The display updating processing updates the registration screen displayed on the display for shop clerk 102 in ACT S103 or ACT S104 according to the content of the current registration buffer 303.

After the processing in ACT S115 is performed, the CPU 10 sets the content of the flag G to '0' (ACT S116). Then, ACT S105 is taken.

If all the commodities purchased by the customer are registered, the shop clerk operates the subtotal key arranged on the keyboard 101. At this time, the CPU 10 determines that the subtotal instruction is input in ACT S109 (YES in ACT S109), the CPU 10 sends a subtotal command and the data (also referred to as transaction data) written in the registration buffer 303 to the POS terminal 2 (ACT S120). The transaction data includes the same record as each record in the registration buffer 303. After the processing in ACT S120 is executed, the CPU 10 ends the operations shown in the flowchart in FIG. 6.

The first registration screen and the second registration screen mentioned above are described.

FIG. 9 is a schematic view illustrating a registration screen 400 as one example of the first registration screen. The registration screen 400 includes a commodity area (equivalent to the first to fifth lines from the top) arranged for each commodity of which the commodity code is written in the registration buffer 303 and a total area (equivalent to the last line). Each commodity area includes areas for displaying a commodity name, a unit price, a purchase quantity X, a purchase quantity Y, a purchase quantity Z, and a price. The purchase quantity X is the purchase quantity recognized through the symbol code reading function for the commodity corresponding to the commodity area. The purchase quantity Y is the purchase quantity recognized through the automatic determination function for the commodity corresponding to the commodity area. The purchase quantity Z is the purchase quantity recognized through the selection determination function for the commodity corresponding to the commodity area. The price is an amount obtained by multiplying the unit price by the total quantity of the purchase quantities X, Y and Z. The total area includes areas for displaying a total quantity of the purchase quantity in each commodity area, a total quantity of the purchase quantity Y in each commodity area, a total quantity of the purchase quantity Z in each commodity area, and a total amount of the price in each commodity area. In FIG. 9, a state in which the information is already displayed in corresponding each commodity area and the total area is shown, however, the information is not displayed in each area of the registration screen 400 at the beginning of the display in ACT S103.

FIG. 10 is a schematic view illustrating a registration screen 500 as one example of the second registration screen. The registration screen 500 includes a commodity area (equivalent to the first to fifth lines from the top) arranged for each commodity of which the commodity code is written in the registration buffer 303 and a total area (equivalent to the last line). Each commodity area includes areas for displaying a commodity name, a unit price, a purchase quantity P, and a price. The purchase quantity P indicates the total purchase quantity of the purchase quantities X, Y and Z of the commodity corresponding to the commodity area which are respectively recognized through the code symbol reading function, the automatic determination function and the selection determination function (P=X+Y+Z). The price is an amount obtained by multiplying the unit price by the quantity P. The total area includes areas for displaying a total quantity of the purchase quantity P in each commodity area and a total amount of the price in each commodity area. In FIG. 10, a state in which the information is already displayed in corresponding each commodity area and the total area, however, the information is not displayed in each area of the registration screen 500 at the beginning of the display in ACT S104.

The display updating processing in ACT S115 is described in detail. In the description, it is assumed that the registration screen 400 is displayed as the first registration screen and the registration screen 500 is displayed as the second registration screen. In the display updating processing, the CPU 10 operates according to the flowchart shown in FIG. 11.

In the flowchart, first, the CPU 10 determines whether or not the commodity (hereinafter referred to as a display target commodity) registered in ACT S114 is the commodity already registered in the same commodity transaction (ACT S401). If a record having the commodity code of the display target commodity does not exist in the registration buffer 303 before the processing in ACT S114 is executed, the CPU 10 determines that the display target commodity is not yet registered. On the other hand, if a record having the commodity code of the display target commodity exists in the registration buffer 303 before the processing in ACT S114 is executed, the CPU 10 determines that the display target commodity is already registered.

If it is determined that the display target commodity is not yet registered (NO in ACT S401), the CPU 10 additionally displays the commodity name and the unit price in the record of the display target commodity in the registration buffer 303 in the commodity area of one of the registration screens 400 and 500 which is being displayed on the display for shop clerk 102 (ACT S402). At this time, the purchase quantities X, Y and Z or the purchase quantity P, and the price thereof in the commodity area is '0'.

After the processing in ACT S402 is executed, or if it is determined in ACT S401 that the display target commodity is a commodity which is already registered (YES in ACT S401), the CPU 10 determines, with reference to the mode information stored in the ROM 11, that the display mode of the display for shop clerk 102 is the individual mode or the non-individual mode (ACT S403).

In the present example, if the display mode of the display for shop clerk 102 is the individual mode, the registration screen 400 is being displayed on the display for shop clerk 102. On the other hand, if the display mode of the display for shop clerk 102 is the non-individual mode, the registration screen 500 is being displayed on the display for shop clerk 102.

If it is determined that the display mode is the individual mode ('individual' in ACT S403), the CPU 10 determines whether or not the identifier in the record of the display target commodity in the registration buffer 303 is 'F0' (ACT S404). If it is determined that the identifier is 'F0' (YES in ACT S404), the CPU 10 adds a purchase quantity ($\alpha$) in the record of the display target commodity in the registration buffer 303 to the purchase quantity X in the commodity area of the display target commodity in the registration screen 400 (ACT S405).

On the other hand, if it is determined that the identifier is not 'F0' (NO in ACT S404), the CPU 10 determines whether or not the identifier is 'F1' (ACT S406). If it is determined that the identifier is 'F1' (YES in ACT S406), the CPU 10 adds the purchase quantity ($\alpha$) in the record of the display target commodity in the registration buffer 303 to the purchase quantity Y in the commodity area of the display target commodity in the registration screen 400 (ACT S407).

If it is determined that the identifier is not 'F1' (NO in ACT S406), the CPU 10 adds the purchase quantity ($\alpha$) in the record of the display target commodity in the registration buffer 303 to the purchase quantity Z in the commodity area of the display target commodity in the registration screen 400 (ACT S408).

After the processing in ACT S405, or ACT S407, or ACT S408 is executed, the CPU 10 updates the price in the commodity area of the display target commodity and the total area in the registration screen 400 (ACT S409).

After the processing in ACT S409 is executed, the CPU 10 determines whether or not the purchase quantity X in the display area of the display target commodity in the registration screen 400 is not '0', and meanwhile both the purchase quantities Y and Z in the same area are '0' (X≠0, Y=Z=0) (ACT S410). If it is determined that the purchase quantities X, Y and Z meet the following condition: X≠0, Y=Z=0 (YES in ACT S410), the CPU 10 sets the display form of the display area of the display target commodity in the registration screen 400 to be a first display form (ACT S411). The first display form is used in a case in which the display target commodity is recognized only through the code symbol reading function.

In ACT S410, if it is determined that the purchase quantities X, Y and Z do not meet the following condition: X≠0, Y=Z=0 (NO in ACT S410), the CPU 10 determines whether or not the purchase quantity X in the display area of the display target commodity in the registration screen 400 is '0' (X=0) (ACT S412). If it is determined that the purchase quantity X is not '0' (NO in ACT S412), the CPU 10 sets the display form of the display area of the display target commodity in the registration screen 400 to be a second display form (ACT S413). The second display form is used in a case in which the display target commodity is recognized through both the code symbol reading function and the object recognition function.

In ACT S412, if it is determined that the purchase quantity X is '0' (YES in ACT S412), the CPU 10 determines whether or not the purchase quantity Y in the display area of the display target commodity in the registration screen 400 is not '0', and meanwhile the purchase quantity Z in the same area is not '0' (Y≠0, Z≠0) (ACT S414). If it is determined that the purchase quantities Y and Z meet the following condition: Y≠0, Z≠0 (YES in ACT S414), the CPU 10 sets the display form of the display area of the display target commodity in the registration screen 400 to be a third display form (ACT S415). The third display form is used in a case that the display target commodity is not recognized through the code symbol reading function but through both the automatic determination function and the selection determination function.

In ACT S414, if it is determined that the purchase quantities Y and Z do not meet the following condition: Y≠0, Z≠0 (NO in ACT S414), the CPU 10 determines whether or not the purchase quantity Y in the display area of the display target commodity in the registration screen 400 is '0' (Y=0) (ACT S416). If it is determined that the purchase quantity Y is not '0' (NO in ACT S416), the CPU 10 sets the display form of the display area of the display target commodity in the registration screen 400 to be a fourth display form (ACT S417). The fourth display form is used in a case in which the display target commodity is recognized only through the automatic determination function.

In ACT S416, if it is determined that the purchase quantity Y is '0' (YES in ACT S416), the CPU 10 sets the display form of the display area of the display target commodity in the registration screen 400 to be a fifth display form (ACT S418). The fifth display form is used in a case in which the display target commodity is recognized only through the selection determination function.

In addition, in ACT S403, if it is determined that the display mode is the non-individual mode ('non-individual' in ACT S403), the CPU 10 adds the purchase quantity (a) in the record of the display target commodity in the registration buffer 303 to the purchase quantity P in the commodity area of the display target commodity in the registration screen 500 (ACT S419).

Figure 11:
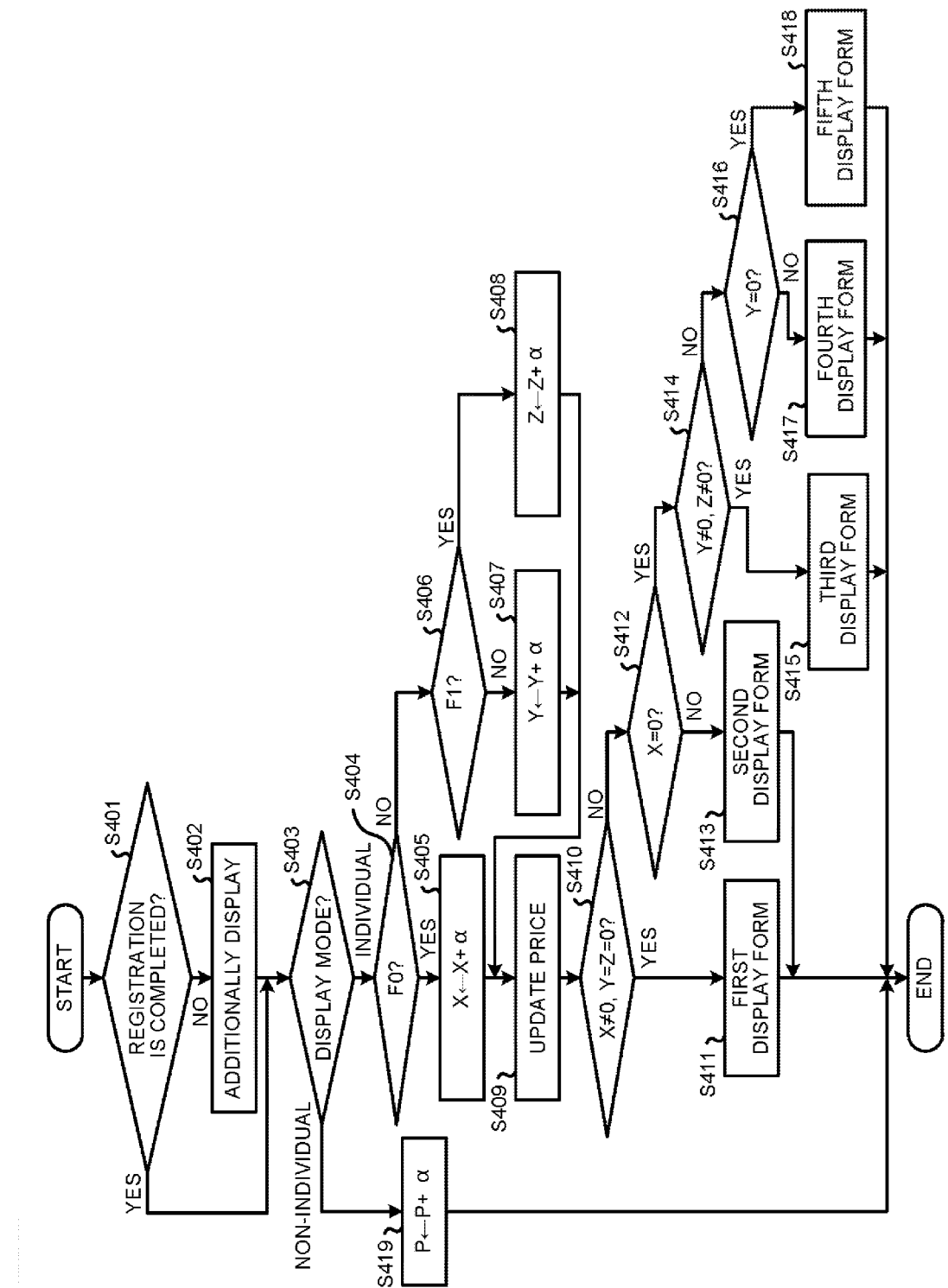
FIG. 11 is a flowchart illustrating operations of the scanner apparatus in a display updating processing.

After the processing in any of ACT S411, ACT S413, ACT S415, ACT S417, ACT S418 and ACT S419 is executed, the CPU 10 ends the operations shown in the flowchart in FIG. 11.

The first display form, the second display form, the third display form, the fourth display form, and the fifth display form are different from each other. Specifically, the display forms can be made different from each other in color, character size, or font of the commodity information (all or part of the commodity name, the unit price, the purchase quantity X, Y, Z and the price) in the commodity area of the display target commodity, or by performing different modifications to the commodity information. As the modification mentioned above, for example, a method of differentiating colors in the commodity areas of the display target commodity, or a method of arranging different marks or graphs in the commodity area can be adopted.

The above-described display updating processing is equivalent to the function of the display control section 114.

A specific example of the display updating processing in a case in which the display mode is an individual mode is described with reference to FIG. 4 and FIG. 9.

As shown in the first record in the registration buffer 303 shown in FIG. 4, in one commodity transaction, first, the shop clerk registers five commodities 'apple A' corresponding to the commodity code 'code C1' through the code symbol reading function. In this case, as shown in FIG. 9, the CPU 10 displays the commodity information of the 'apple A' in the uppermost commodity area on the registration screen 400. In the registration buffer 303, the identifier of the record is 'F0' and the purchase quantity is '5'. Thus, the CPU 10 updates the purchase quantity X in the commodity area in the registration screen to '5'. At this time, since the purchase quantities X, Y and Z in the display area meet the following condition: X≠0, Y=Z=0, the CPU 10 sets the display area to be the first display form (ACT S411).

Next, as shown in the second record in the registration buffer 303 shown in FIG. 4, the shop clerk registers one commodity 'apple A' corresponding to the commodity code 'code C1' through the selection determination function this time. In this case, as shown in FIG. 9, the CPU 10 updates the purchase quantity Z in the display area of the 'apple A' in the registration screen 400 to '1'. At this time, since the purchase quantities X, Y and Z in the display area meet the following condition: X≠0, Y=0 and Z≠0, the CPU 10 changes the display form of the display area from the first display form to the second display form (ACT S413).

Similarly, in a case in which the shop clerk registers the commodities in a way as shown in the third to seventh records in the registration buffer 303 shown in FIG. 4, the registration screen 400 displays information as shown in the commodity area from the second to the fifth line in FIG. 9. In FIG. 9, different patterns are applied to the commodity areas in response to the first to the fifth display forms, the first to the fifth display forms are shown.

In addition, in a case in which the display mode is the non-individual mode, if the commodities are registered as shown in the registration buffer 303 in FIG. 4, the registration screen 500 is displayed as shown in FIG. 10.

(Operations of the POS Terminal)

Next, the operations of the POS terminal 2 are described.

After receiving the transaction data sent from the scanner apparatus 1 together with the subtotal command, the CPU 20 of the POS terminal 2 writes the transaction data in the RAM 22. In this way, the processing of acquiring the commodity information of the commodity recognized by the scanner apparatus 1 by receiving the transaction data is equivalent to the function of the acquisition section 210.

Figures 12, 13:
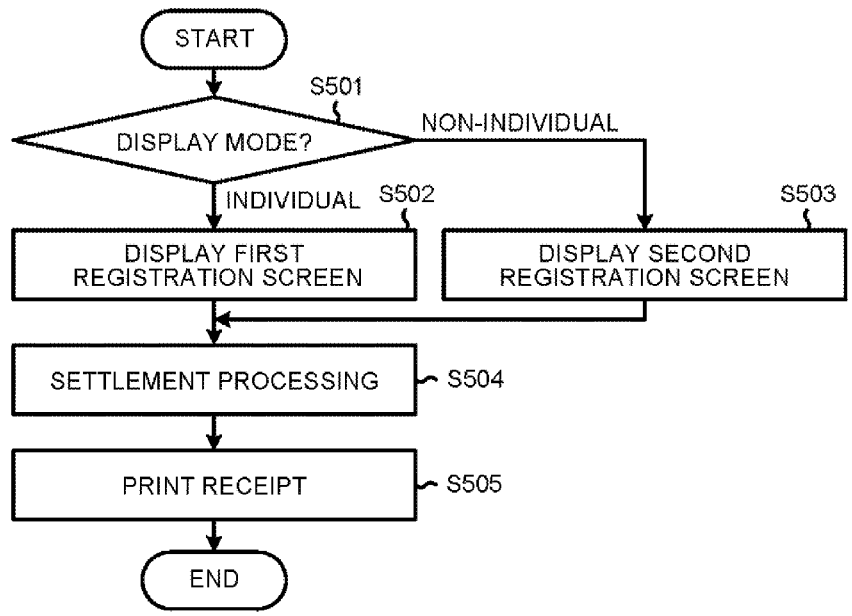
FIG. 12 is a flowchart illustrating main operations of the POS terminal.
FIG. 13 is a schematic view illustrating one example of a receipt printed by the POS terminal.

If the turn to carry out the checkout processing of the commodity transaction relating to the transaction data comes, the CPU 20 operates according to the flowchart shown in FIG. 12 on the transaction data as a target.

In the flowchart, first, the CPU 20 determines, with reference to the mode information stored in the ROM 21, that the display mode of the display for shop clerk 201 is the individual mode or the non-individual mode (ACT S501). The mode information stored in the ROM 21 indicates one of the individual mode and the non-individual mode. The mode information can be switched to the individual mode or the non-individual mode by a user through, for example, an operation on the keyboard 200 of the POS terminal 2.

If it is determined that the display mode is set to the individual mode ('individual' in ACT S501), the CPU 20 displays the first registration screen on the display for shop clerk 201 (ACT S502). The first registration screen is, for example, the same as that shown in FIG. 9. The processing in ACT S502 is equivalent to the function of the display control section 211.

On the other hand, if it is determined that the display mode is set to the non-individual mode ('non-individual' in ACT S501), the CPU 20 displays the second registration screen on the display for shop clerk 201 (ACT S503). The second registration screen is, for example, the same as that shown in FIG. 10.

After the processing in ACT S502 or ACT S503 is executed, the CPU 20 executes a settlement processing (ACT S504). In the settlement processing, the CPU 20 executes the processing for settling the payment of the commodity transaction in a procedure corresponding to the payment method such as cash, credit card, electronic money and the like designated by a shop clerk through an operation on the keyboard 200. The processing in ACT S504 is equivalent to the function of the settlement section 212.

After the settlement processing is performed, the CPU 20 enables the printer 203 to print the receipt and the journal of the commodity transaction (ACT S505). The journal is not limited to be printed on a paper media, but may be stored as electronic data in a database stored in the auxiliary storage device 24 or the store computer 3. The processing in ACT S505 is equivalent to the function of the print control section 213.

After the processing in ACT S505 is executed, the CPU 20 ends the operations shown in the flowchart in FIG. 12.

FIG. 13 is a schematic view illustrating one example (receipt 600) of the receipt printed by the printer in ACT S505. The receipt 600 includes the commodity information (the commodity name, the purchase quantity and the price) corresponding to each record contained in the transaction data, the total quantity and the total price.

The receipt 600 includes an identification character 'o' at the left hand side of the commodity information in the corresponding record of which the identifier 'F1' is written. The receipt 600 further includes an identification character 'c' at the left hand side of the commodity information in the corresponding record of which the identifier 'F2' is written. In this way, by adding or not adding an identification character, the commodity information is arranged on the receipt 600 in such a manner that the printing form of the commodity information of the commodity recognized through the code symbol reading function is made different from the printing form of the commodity information of the commodity recognized through the object recognition function. Further, the commodity information is arranged on the receipt 600 in such a manner that the printing form of the commodity information of the commodity recognized through the automatic determination function is made different from the printing form of the commodity information of the commodity recognized through the selection determination function with different identification characters.

The printing forms of the commodity information of the commodities recognized through each function may also be made different from each other by adding modification such as other character or mark, or an underline to the commodity information or by differentiating the font or size of the characters, instead of using the identification characters. In addition, the journal printed by the printer 203 includes the commodity information arranged in the same printing form as the receipt 600.

As stated above, the scanner apparatus 1 and the POS terminal 2 according to the present embodiment display the first registration screen. The commodity information is displayed on the first registration screen in such a manner that the display form of the commodity information of the commodity recognized through the code symbol reading function is made different from the display form of the commodity information of the commodity recognized through the object recognition function. Thus, the shop clerk can easily know that the registered commodity is recognized through either the code symbol reading function or the object recognition function from the first registration screen.

According to another viewpoint of the present embodiment, the commodity information is displayed on the first registration screen in such a manner that the display form of the commodity information of the commodity recognized through the automatic determination function is made different from the display form of the commodity information of the commodity recognized through the selection determination function. Thus, the shop clerk can easily know that the registered commodity is recognized through either the automatic determination function or the selection determination function from the first registration screen.

An effect of preventing an erroneous commodity registration can be expected if the method with which the registered commodity is recognized is known. For example, it is assumed that a customer carries five apples A with a barcode, five apples B with no barcode and five apples C with no barcode to the register, and the shop clerk holds the apple over the image capturing area of the camera 100 one by one to register these apples. In this case, each apple is registered as shown in the following (a)-(d).

(a) The five apples A are all registered through the code symbol reading function.

(b) Four of the apples B and four of the apples C are registered through the automatic determination function.

(c) One of the apples C is registered through the selection determination function.

(d) One of the apples B is registered through the selection determination function; at this time, however, the apple A and the apple B are displayed as the candidate, and the shop clerk selects the apple A in error.

After the processing in (a)-(d) is performed, the registration screen 400 is displayed as shown in the first to third lines in FIG. 9. The shop clerk can know, according to the difference in display forms of the commodity area and the purchase quantities X, Y and Z, that there is a commodity which is registered through both the code symbol reading function and the object recognition function. In a case in which a same commodity is registered through both the code symbol reading function and the object recognition function, there is a possibility that other commodity with no barcode is registered as the commodity in error. Therefore, the shop clerk confirms the quantities of the commodities (actual apples A, B and C), and then realizes that the apple B is registered in error. Further, though the apples C are registered correctly in the present example, in a case in which a commodity is registered through both the automatic determination function and the selection determination function, the shop clerk can realize an erroneous registration by confirming the quantities of the actual commodities.

In addition, with such a first registration screen, an effect of preventing the double registration of a same commodity, preventing registration omission of the commodity, and realizing the facilitation of the investigation of cause of such accidents if erroneous registration occurs can be expected.

The commodity information is arranged on the receipt printed by the printer 203 in such a manner that the printing form of the commodity information of the commodity recognized through the code symbol reading function is made different from the printing form of the commodity information of the commodity recognized through the object recognition function. Thus, the shop clerk or the customer can easily know that the sold commodity or purchased commodity is recognized through either the code symbol reading function or the object recognition function from the receipt. In addition, the commodity information is arranged on the receipt printed by the printer 203 in such a manner that the printing form of the commodity information of the commodity recognized through the automatic determination function is made different from the printing form of the commodity information of the commodity recognized through the selection determination function. Thus, the shop clerk or the customer can easily know that the sold commodity or purchased commodity is recognized through either one of the automatic determination function and the selection determination function from the receipt.

Besides, with such a constitution disclosed in the present embodiment, various good effects can be achieved.

(Modification)

In the embodiment above, a POS system in which checkout processing is carried out through operations of the shop clerk is disclosed. However, the processing executed by the scanner apparatus 1 and the POS terminal 2 may also be applied to a self-checkout POS system in which the checkout processing is carried out through operations by a customer.

The scanner apparatus 1 and the POS terminal 2 may be integrally arranged in a single housing.

The code symbol read through the code symbol reading function is not limited to a barcode, and may also be a two-dimensional code such as a QR code (registered trademark) and the like.

The first registration screen is not limited to the form of the registration screen 400 shown in FIG. 9. A registration screen 401 serving as another example of the first registration screen is shown in FIG. 14. The registration screen 400 shown in FIG. 9 includes the purchase quantities of the commodity registered through the code symbol reading function, the automatic determination function and the selection determination function in the commodity area in only one line. On the contrary, the registration screen 401 shown in FIG. 14 includes, even for one same commodity, a commodity area for each commodity recognition method (for each of the code symbol reading function, the automatic determination function and the selection determination function). The commodity area of the registration screen 401 includes any one of a 'barcode' indicating the code symbol reading function, an 'automatic determination' indicating the automatic determination function and a 'cashier selection' indicating the selection determination function as the commodity recognition method. With such a registration screen 401 also, it can be distinguished that each piece of the commodity information on the screen relates to the commodity registered with a specified one of the code symbol reading function, the automatic determination function, and the selection determination function.

As the distinguishable recognition methods, other method may also be used in the first registration screen and the receipt in addition to the recognition through the code symbol reading function, the automatic determination function and the selection determination function. The other method may be, for example, operating a preset key assigned to a commodity, reading an RFID (Radio Frequency IDentification) tag attached to the commodity, or directly inputting the commodity code through an operation on the numeric key and the like.

In the embodiment described above, computer programs for realizing processing relating to the operations shown in the flowcharts in FIG. 6, FIG. 7, FIG. 8 and FIG. 11 are stored in the ROM 11 of the scanner apparatus 1 in advance, and computer program for realizing processing relating to the operations shown in the flowchart in FIG. 12 is stored in the ROM 21 of the POS terminal 2 in advance. However, the present invention is not limited to this, the same programs as described above may be downloaded to the scanner apparatus 1 and the POS terminal 2 through a network. Alternatively, the same programs recorded in a recording medium may also be installed in the scanner apparatus 1 and the POS terminal 2. The form of the recording medium is not limited as long as the recording medium can store programs like a CD-ROM and a memory card and is readable by an apparatus. Further, the function realized by the installed or downloaded program can also be realized through the cooperation with an OS (operating system) installed in the scanner apparatus 1 and the POS terminal 2.

Further, the functions of realizing the processing executed by the scanner apparatus 1 and the POS terminal 2 and a part of the constitution of the scanner apparatus 1 and the POS terminal 2 may also be arranged in a server apparatus which is connected to the scanner apparatus 1 and the POS terminal 2 for communication. In a case in which the system is constructed in this way, for example, a cloud computing can be used. More specifically, a software providing form referred to as a SAAS (software as a service) is applicable.

Figure 15:
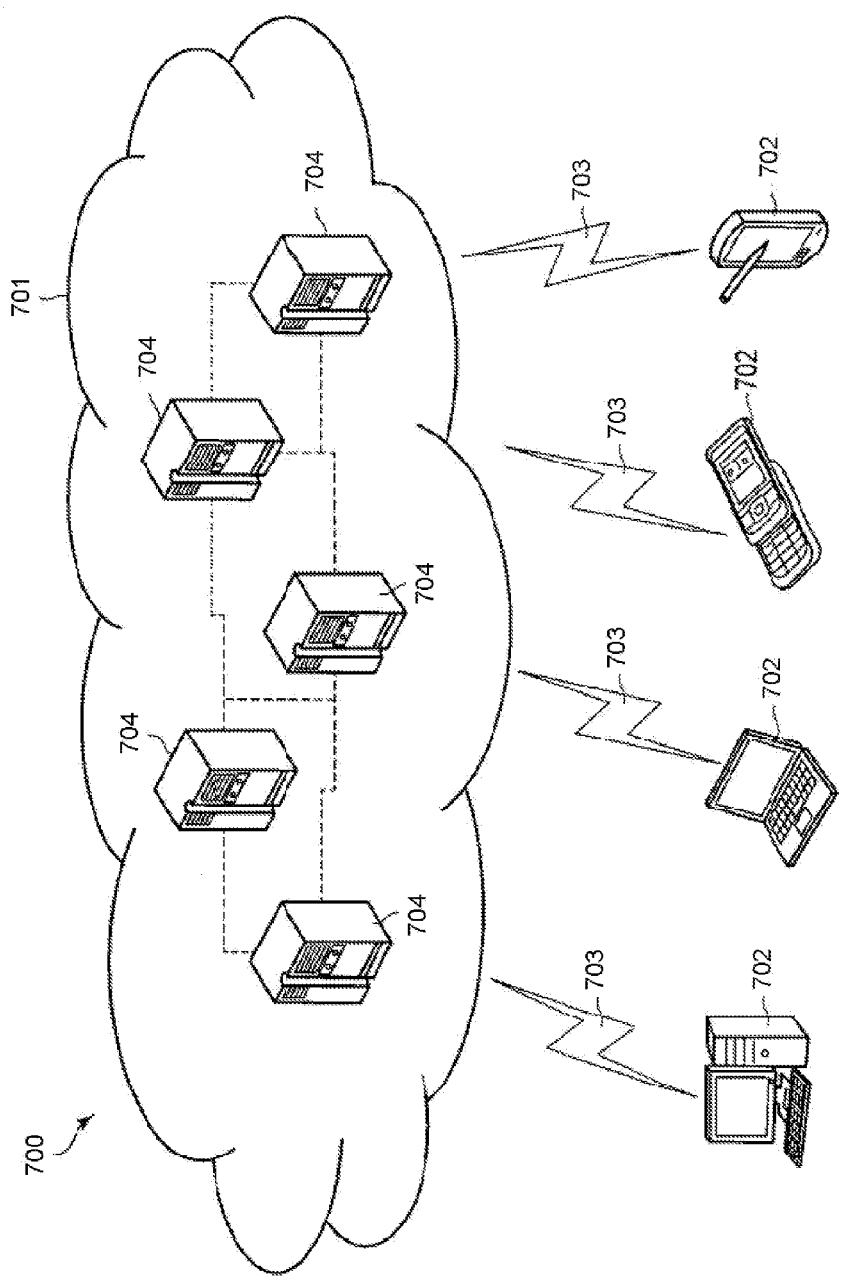
FIG. 15 is a diagram illustrating an example of constitution of a POS system which uses the cloud or cloud computing.

FIG. 15 is a diagram illustrating a constitution of a POS system 700 which uses a cloud system. The POS system 700 includes a cloud 701, a plurality of terminal apparatuses 702 and a plurality of communication networks 703 and a plurality of server apparatuses 704 connected with each other for communication. Number of the terminal apparatuses 702, the communication networks 703 and the server apparatuses 704 may be one, respectively.

The terminal apparatus 702 can communicate with the cloud 701 through the communication network 703. The scanner apparatus 1 and the POS terminal 2 described in the embodiment above, various computers such as a desktop computer or a notebook computer, a mobile phone apparatus, a portable digital assistant (PDA), or a smart phone and the like may be properly used as the terminal apparatus 702.

Various networks such as an internet, a private network, a next generation network (NGN), or a mobile network may be properly used as the communication network 703.

In the POS system 700 with such a constitution, for example, a part of the functions for realizing each processing in the flowcharts in FIG. 6, FIG. 7, FIG. 8, FIG. 11 and FIG. 12 may be provided in the server apparatus 704. Further, the hardware such as the display for shop clerk 102, 201, the printer 203 and the like and the rest of the functions for realizing each processing in the flowcharts in FIG. 6, FIG. 7, FIG. 8, FIG. 11 and FIG. 12 may be provided in the terminal apparatus 702. The terminal apparatus 702 and the server apparatus 704 mutually carry out communication to realize each processing disclosed in the embodiment above. The effect described in the embodiment above can also be obtained through such a POS system 700.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity information display apparatus, comprising:
   an acquisition module configured to acquire a commodity information relating to a commodity recognized through a first method in which a code symbol is read attached to the commodity, and a commodity information relating to a commodity recognized through a second method in which the commodity is recognized based on an appearance feature of the commodity contained in an image data captured by a camera, wherein the commodity is recognized based on a comparison of the image data and stored parameterized metric data associated with a reference image data of the commodity facilitated by the second method; and
   a display control module configured to display the commodity information acquired by the acquisition module on a display in such a manner that a display form of the commodity information of the commodity recognized through the first method is made different from a display form of the commodity information of the commodity recognized through the second method.

2. The commodity information display apparatus according to claim 1, wherein
   the display control module makes the display forms different from each other by differentiating a color, a character size, or a font between the commodity information of the commodity recognized through the first method and the commodity information of the commodity recognized through the second method, or by forming different modifications to the commodity information of the commodity recognized through the first method and the commodity information of the commodity recognized through the second method.

3. The commodity information display apparatus according to claim 1, wherein
   the display control module respectively displays, for the same commodity recognized through both the first method and the second method, the quantity of the commodity recognized through the first method and the quantity of the commodity recognized through the second method on the display.

4. The commodity information display apparatus according to claim 1, further comprising:
   a settlement module configured to settle payment of the commodity relating to the commodity information acquired by the acquisition module in one commodity transaction; and
   a print control module configured to enable a printer to print a receipt on which the commodity information of the commodities recognized through the first method and the second method in the commodity transaction the payment of which is settled by the settlement module is arranged in such a manner that the printing form of the commodity information of the commodity recognized through the first method is made different from the printing form of the commodity information of the commodity recognized through the second method.

5. A commodity information display apparatus, comprising:
   an acquisition module configured to acquire a commodity information relating to a commodity recognized through a first method in which the commodity is recognized as a commodity of a specific category based on an appearance feature of the commodity contained in an image data captured by a camera, and a commodity information relating to a commodity recognized through a second method in which one or a plurality of categories of candidates of the commodity are selected based on the appearance feature of the commodity contained in the image data captured by the camera, wherein the one or the plurality of categories of candidates of the commodity are further selected as a function of a comparison between the appearance feature of the commodity contained in the image data and stored parameterized metric data associated with a reference image of the commodity, and then one category designated from the candidates by a user is recognized as the commodity; and
   a display control module configured to display the commodity information acquired by the acquisition module on a display in such a manner that a display form of the commodity information of the commodity recognized through the first method is made different from a display form of the commodity information of the commodity recognized through the second method.

6. A method for displaying commodity information in different forms, including:
   acquiring a commodity information relating to a commodity recognized through a first method in which a code symbol attached to the commodity is read and commodity information relating to a commodity recognized through a second method in which the commodity is recognized based on an appearance feature of the commodity contained in an image data captured by a camera, wherein the second method facilitates recognition of the commodity in response to a comparison between the appearance feature of the commodity and a stored parameterized metric of a reference image of the commodity; and
   displaying the acquired commodity information on a display in such a manner that a display form of the commodity information of the commodity recognized through the first method is made different from a display form of the commodity information of the commodity recognized through the second method.

* * * * *